Oct. 7, 1924.

F. H. BROWN 1,510,758

ART OF REGULATING COMBUSTION OF FUEL

Filed Dec. 26, 1919        4 Sheets-Sheet 1

Fig.1

Inventor:
Francis H. Brown
by Robt. P. Hains
Attorney

Oct. 7, 1924.
1,510,758
F. H. BROWN
ART OF REGULATING COMBUSTION OF FUEL
Filed Dec. 26, 1919
4 Sheets-Sheet 2

Inventor:
Francis H. Brown
by Robt. P. Hains
Attorney

Oct. 7, 1924.  
F. H. BROWN  
1,510,758  
ART OF REGULATING COMBUSTION OF FUEL  
Filed Dec. 26, 1919  4 Sheets-Sheet 3

Oct. 7, 1924.                                                      1,510,758
F. H. BROWN
ART OF REGULATING COMBUSTION OF FUEL
Filed Dec. 26, 1919        4 Sheets-Sheet 4

Inventor:
Francis H. Brown
by Robt. P. Hains
Attorney

Patented Oct. 7, 1924.

1,510,758

UNITED STATES PATENT OFFICE.

FRANCIS H. BROWN, OF GLENOLDEN, PENNSYLVANIA.

ART OF REGULATING COMBUSTION OF FUEL.

Application filed December 26, 1919. Serial No. 347,575.

*To all whom it may concern:*

Be it known that I, FRANCIS H. BROWN, a citizen of the United States, residing at Glenolden, in the county of Delaware and State of Pennsylvania, have invented an Improvement in Art of Regulating Combustion of Fuel, of which the following description, in connection with the accompanying drawings, is a specification, like characters on the drawings representing like parts.

The invention to be hereinafter described relates to the art of regulating the combustion of fuel, and more particularly to modifying and correcting a primary regulation of combustion, by a secondary regulation which, in the present instance, is in response to variations in the composition of the gases of combustion. Various conditions, operations, methods and devices may be controlled or regulated, such, for example, as the supply of fuel and the supply of air requisite to maintain substantially constant any predetermined desired standard operating or working condition. For example, to obtain efficient combustion, it is desirable to maintain substantially constant a predetermined percentage of carbon dioxide ($CO_2$) in the gases of combustion, or it may be desirable to maintain a predetermined percentage of another element in the composition of the gases of combustion. The present invention, therefore, provides a method for automatically effecting, correcting or modifying regulation in response to variations in the composition of the gases of combustion, and in the present instance, for purposes of illustration, in response to variations in the $CO_2$ content of the gases of combustion.

It is desirable that the regulation of the combustion shall be effected primarily in response to variations in certain conditions of combustion, and secondarily in response to variations in the composition of the gases of combustion, or in other words, the primary regulation may be corrected or modified in response to variations in the composition of the gases of combustion. In the present instance of the invention, the method is practiced in connection with a furnace of a steam generator, and the primary regulation is in response to steam pressure and flow, or either of them, and the pressure in the furnace; and the secondary regulation is in response to variations in the $CO_2$ content of the gases of combustion, this secondary regulation being employed to correct or modify the primary regulation obtained in response to variations in steam pressure and flow, and variations in the pressure in the furnace.

It will be understood, however, that the furnace of a steam generator is merely selected as one good form of apparatus in which the method may be practiced, and that it is applicable to any desired design type or construction of furnace or its equivalent employed for any purpose desired.

The method may be practiced or used in regulation of combustion of solid fuel such as coal, coke and breeze, or liquid fuel, such, for example, as crude oil or a product or a derivative of it, and gaseous fuels. The supply of fuel and air and other conditions may be correctly regulated so as to maintain substantially constant any predetermined desired standard of composition of the gases resulting from the combustion of the fuel.

Where solid fuel is employed, the feed thereof to the furnace may be effected by an automatic stoker, and the operation of the stoker may be controlled. Where oil is the fuel, the feed of oil to the burner and the supply of steam or compressed air to the burner or any other means for atomizing the fuel may be controlled.

The pressure in the furnace is dependent upon varying conditions, such, for example, as the draught anterior and posterior to the combustion chamber, and where solid fuel is used, the degree of porosity of the fuel bed is a further factor affecting the pressure in the furnace. Therefore, it is desirable to control the draught both anterior and posterior to the combustion chamber.

In the present instance of the invention, the method is used to obtain primary regulation of the feed of fuel to the furnace in response to variations in steam pressure and flow, or either of them, and feed of the fuel is indirectly corrected or modified in response to variations in the composition of the gases of combustion. The damper in the uptake posterior to the furnace, in the present instance, also is regulated primarily in response to steam pressure and flow, or either of them, and the primary regulation of this damper is modified or corrected in response to variations in the composition of the gases of combustion. The damper anterior to the furnace, in the present instance, is regulated primarily in response to variations in the pressure in the furnace, and the regulation of this damper is indirectly corrected or modified in response to variations in the composition of the gases of combustion.

The supply of feed water to the steam generator may also be primarily regulated in response to steam pressure or flow, and the primary regulation of the supply of feed water may be modified or corrected in response to variations in the composition of the gases of combustion.

With the aforesaid and other purposes of the invention, in view, the character of the method will be best understood by reference to the following description of one good form of apparatus in which the method may be practiced, shown in the accompanying drawings, wherein:—

Figure 1:
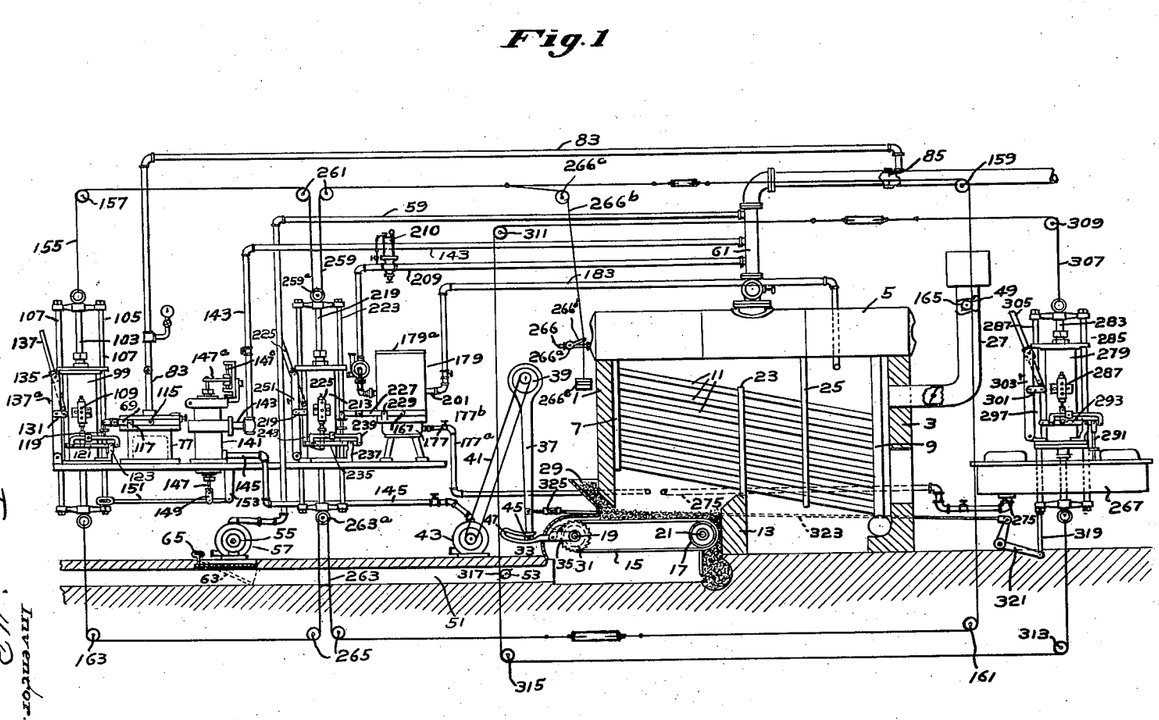
Fig. 1 is a diagrammatic view of a furnace for a steam generator equipped with combustion regulation devices embodying the invention.

Referring to the drawings, and more particularly to Fig. 1, a steam generator is shown therein for purposes of illustration, of the Babcock & Wilcox type, and comprises a front wall 1 and a rear wall 3 supporting a drum 5. A front header 7 and a rear header 9 communicate with the drum 5 and are connected by inclined water tubes 11. Beneath the water tubes is a bridge wall 13, and an automatic stoker conveniently in the form of an endless grate 15 mounted on wheels 17 on front and rear shafts 19 and 21. Baffle plates 23 and 25 are provided to cause the gases of combustion to pass and re-pass the water tubes in their transit from the grate to the uptake 27.

The fuel may be delivered to the endless grate or automatic stoker by a hopper 29 which may receive coal or other fuel from a bin or other source of supply. Any suitable means may be provided for automatically gradually feeding the endless grate. To accomplish this, in the present instance, the front shaft 19 therefor may be provided with a ratchet wheel 31 provided with a pawl 33 carried by a rocking arm 35 pivotally mounted on the shaft 19. To rock said arm, a rod 37 may have one end connected to said arm and its opposite end connected to an eccentric 39 adapted to be driven by a belt 41 from a steam turbine 43 or other suitable source of power. To vary the extent of rocking movement of the pawl arm 35, the eccentric rod 37 may be provided with a pin carrying a roller 45 mounted in an elongated slot 47 in said arm. The eccentric arm may be adjusted varying distances from the shaft 19 by means to be described to vary the effective radius of said arm and thereby vary the speed of feed of the grate.

The uptake 27 may be provided with a valve or damper 49 to regulate the draft posterior to the furnace. The air anterior to the combustion chamber may be admitted through a passage 51 and regulated by a valve or damper 53. The draft may be natural or forced as desired. To furnish forced draft, a fan 55 may be provided communicating with the passage 51, and may be driven by a steam turbine 57 to which steam may be supplied through a pipe 59 connected to the steam delivery pipe 61 leading from the generator. To enable either natural or forced draft to be used, a valve or gate 63 may be provided in the air passage 51 under control of a handle 65, the construction being such that the fan may communicate with said passage or be cut off from communication with said passage as desired.

As stated, the present invention contemplates that a primary regulation of combustion conditions may be effected or obtained in response to variations in steam pressure and flow, or either of them. To effect this primary regulation, in the present instance of the invention, a motor may be provided conveniently in the form of a diaphragm motor of the general construction shown in Letters Patent of the United States, No. 1,098,935, granted to me June 2, 1914. This motor may comprise a block 67 (Fig. 2), and spacing rings 69 confined between a pair of diaphragms 71 having their marginal portions confined between a head 73 and a flange 75 of a casing 77, a spacing ring 79 being interposed between the margins of said diaphragms. A chamber 81 in the head 73 above the upper diaphragm 71 may be subject to variations in steam pressure or variations in the load or demand on the boiler, exemplified herein by variations in steam flow. To accomplish this, the chamber 81 may be connected by a pipe 83 with the steam delivery pipe 61 of the boiler at a point beyond an orifice plate 85 (Fig. 1). The dynamic pressure of the steam flowing through the orifice plate will be transmitted through the pipe 83 to the chamber 81 above the diaphragm, and the latter will be responsive to variations both in the dynamic and static pressure of the steam.

In order that the motor diaphragm may be susceptible of positive, sensitive and reliable operation, an air cushion may be provided at the side of the diaphragm motor opposed to the chamber 81, and may be of the general construction shown in the patent referred to. This air cushion comprises, in the present instance, an inverted cup or container 87 (Fig. 2) mounted in the casing 77, and containing an air pocket 89. It is desirable that a predetermined pressure shall be maintained in the casing 77 on the air cushion within the inverted cup and against the lower diaphragm 71 on the under side of the motor diaphragm. To accomplish this, in the present instance, ports 91, 93 and 95 may be provided in the head 73, the spacing ring 79 and the casing flange 75 to admit steam condensation from the chamber 81 into the casing 77. A suitable valve 97 may be provided in the head 73 to admit steam condensation to said casing or cut off the supply therefrom as desired.

Figure 2:
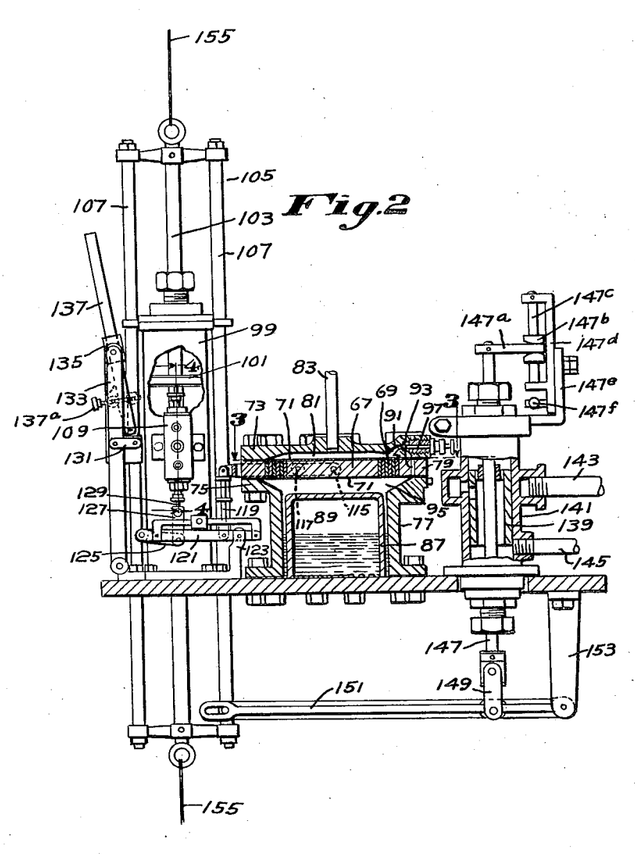
Fig. 2 is a side elevation of the motor and mechanism operable in response to steam flow for controlling the fuel feed and the damper in the uptake, certain parts of said mechanism being shown in section.
Figure 3:
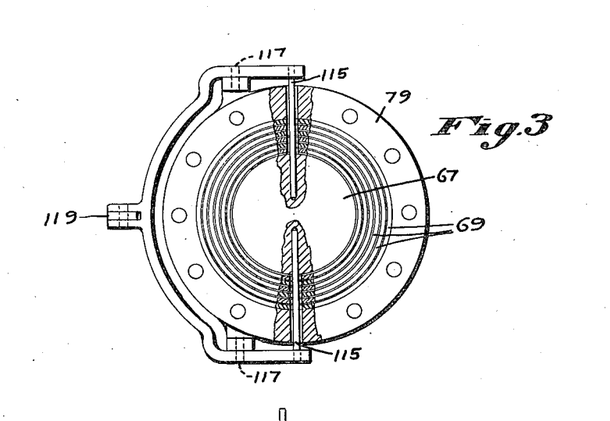
Fig. 3 is a horizontal section taken on line 3—3 of Fig. 2.

In the use of this diaphragm motor, the valve 97 is opened, thereby subjecting the under side of the diaphragm to the boiler steam pressure, and then said valve is closed to maintain said pressure on the air cushion afforded by the inverted cup and the diaphragm. Any variations in the pressure of the steam flow will be transmitted through the pipe 83 to the chamber 81 at the upper side of the diaphragm, and the latter will move up or down according to whether the steam pressure rises or falls due to dynamic or static changes or variations in flow, or both.

Figure 4:
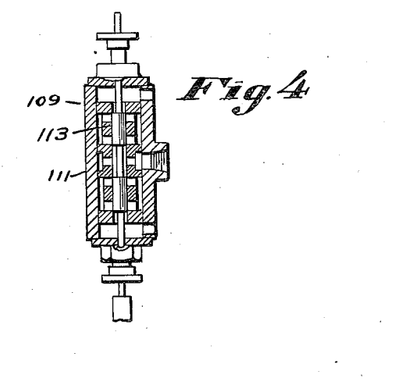
Fig. 4 is a section taken on line 4—4 of Fig. 2.

Suitable means may be provided under the control of the motor diaphragm to furnish the necessary power for operating the fuel feed and for operating the damper in the uptake. This means, in the present instance, comprises a cylinder 99 (Fig. 2) containing a piston 101 connected by a rod 103 with the upper and lower ends of a frame 105 having rods 107 adapted to slide through apertures in extensions of the heads of the cylinder 99. Suitable fluid pressure may be applied above or beneath the piston 101 in the cylinder to move the piston up or down therein as desired. To control the admission of the fluid pressure to the cylinder and exhaust therefrom at opposite sides of the piston, a pilot valve device 109 may be provided (Figs. 2 and 4) comprising a casing 111 containing a piston valve 113 for controlling the fluid supply and exhaust passages communicating with the cylinder.

The motor diaphragm may be operatively connected to the piston valve 113 to control the movements thereof. To accomplish this, in the present instance, the motor diaphragm block 67 may have a rod 115 projecting therethrough, with its ends projecting through enlarged openings in the spacing rings 69 and 79, the ends of said rod being connected to a fork lever 116 fulcrumed intermediate its ends on pins 117 mounted on the spacing ring 79. This fork lever may be connected by an adjustable link 119 with a lever 121 fulcrumed intermediate its ends on a support 123. At the left end of the lever 121, a bell crank 125 is pivotally mounted, and has one arm connected by a link 127 with the stem 129 of the piston valve 113. The other arm of the bell crank may be connected by a link 131 with an upright standard 133 having its lower end pivotally mounted on an extension of the lower head of the cylinder 99. Pivotally connected to the upper end of the standard 133 is a shoe 135 in which is slidably mounted an angle bar 137 having its lower end connected to one of the rods 107 of the frame 105 which is moved up or down by the piston 101 in the cylinder 99.

The construction is such that when the motor diaphragm moves up or down in response to variations in the steam flow, the lever 121 will be rocked, and through the bell crank and the link 127, will operate the pilot valve to admit fluid pressure into the cylinder 99 and move the piston 101. This movement of the piston will move the frame 107 and the angle bar 137 which slides in the shoe 135 of the standard 133. Since the angle bar 137 is oblique to the piston rod 103, as said bar slides along its shoe, it will rock the standard 133, and the latter in turn through the link 131, will rock the bell crank and move the piston valve to cut off the supply of fluid pressure to the cylinder 99 and thereby prevent further movement of the piston 101. The piston valve will be operated by the system of levers to move the cylinder piston 101 and the frame 105 up or down depending on the direction in which the pilot valve is moved by the system of levers in response to movement of the diaphragm motor. The angle bar 137 may be pivotally connected to the frame rod 107, and the angle thereof with respect thereto may be varied by an adjusting screw 137ª. The movement of the piston actuated frame 105 may be utilized to control the supply of steam to the steam turbine 43 referred to, for operating the fuel stoker. To this end a rotary reciprocatory valve 139 (Fig. 2) may be provided of the general construction disclosed in the patent referred to. The casing 141 for this valve may be connected by a pipe 143 with the steam supply pipe 61. The valve casing may be connected by a pipe 145 with the turbine 43 for operating the automatic stoker. The construction is such that the steam turbine will be driven at a speed varying according to the variation in the supply of steam admitted thereto through the pipes 143 and 145 under the control of the rotary reciprocatory valve 139.

To operatively connect the valve 139 with the frame 105, the valve may be provided with a stem 147 connected by a link 149 with a lever 151 having one end pivotally connected to a bracket 153, and the other end connected to the frame 105. The movement of said frame will be transmitted by the lever 151 and link 149 to the valve stem 147 and shift the valve vertically. To impart rotary movement to the valve as it is shifted vertically, its stem may be extended upward beyond the casing 141 and have an arm $147^a$ connected thereto having a spool $147^b$ at the outer end thereof adapted to slide on an inclined bar $147^c$ carried by a frame $147^d$ pivotally mounted on a bracket $147^e$ and secured in different positions of adjustment by an adjusting screw $147^f$.

Suitable means may be provided to operatively connect the frame 105 with the damper 49 in the uptake 27 of the boiler. This means, in the present instance, comprises a cord 155 (Fig. 1) or other suitable flexible connection having its ends connected to rings at the upper and lower ends of the frame 105, said cord being guided by upper pulleys 157 and 159 and guided by lower pulleys 161 and 163. The run of the cord intermediate the pulleys 159 and 161 may be wound one or more turns about a pulley 165 connected to the damper 49, the construction being such that movement of the frame 105 up or down will shift the cord and turn the damper to automatically regulate the draft posterior to the combustion chamber.

It will be understood that the diaphragm motor which moves in response to variations in steam flow, will operate through the system of levers described to move the piston actuated frame 105 up or down, and through the rotary reciprocatory valve actuated thereby, will vary the speed of the steam turbine for operating the stoker, and the movement of said frame through the cord 155 will operate the damper 49 to regulate the draft in the uptake. This constitutes the primary regulation of the fuel feed and the draft in the uptake.

Suitable means may be provided to operate in response to variations in the composition of the gases of combustion to correct or modify the regulation had by the primary regulation means described. This secondary regulation, in the present instance, is in response to variations in the $CO_2$ content of the gases of combustion, but the secondary regulation may be in response to variations in other elements or conditions of the gases of combustion under certain circumstances.

To accomplish the secondary regulation, in the present instance, a diaphragm motor may be provided comprising a block 167 (Fig. 6) and spacing rings 169 confined between upper and lower diaphragms 171, said diaphragms being confined between a head 173 and a flange 175 of a casing 177. A box or casing 179 may have its base secured to the head 173. This casing has a horizontal wall 181 adjacent the base thereof forming a chamber 183 communicating with the upper diaphragm 171 through a port 185. The casing is further divided by a foraminous wall 187 and a porous wall 189 which may have a facing wall 191 of wool fibres or other suitable porous material which may be held in place by a wall 193 of woven wire. The vertical walls 187 and 189 divide the casing 179 into an inlet chamber 195, a central chamber 197 and an outlet chamber 199. The inlet chamber 195 may be connected by a pipe 201 with the furnace posterior to the combustion chamber so as to conduct a continuous sample of the gases of combustion to the inlet chamber. The outlet chamber 199 may be provided with a suitable device for drawing the products of combustion from the furnace into the inlet chamber 195, thence through the central chamber 197 and the outlet chamber 199. This device, in the present instance, is in the form of a fan 203 connected by a pipe 205 with the outlet chamber 199. This fan may be rotated by a turbine 207 driven by steam conducted to the turbine from the steam supply pipe 61 through a pipe 209. The pipe 209 may have a well known pressure reducing valve 210 therein to reduce the pressure somewhat below the normal boiler pressure and maintain it uniform at the reduced pressure to insure a uniform speed on the turbine and consequently produce a constant suction through the casing 179. A suitable material may be introduced into the central chamber 197 to absorb carbonic dioxide gas ($CO_2$) from the gases of combustion passing therethrough. This absorbent material may be caustic soda, caustic potash, or lime. A block 210 of this material in the construction shown is inserted in and fills the central chamber 197, and the supply thereof may be renewed from time to time on removal of the cover $179^a$ of the casing 179. The wall 181 of the casing 179 may have a port 181ª communicating with the chamber above the upper diaphragm 171, so that the pressure in the outlet chamber 199 of the casing may be transmitted to said diaphragm. The casing 177 beneath the lower diaphragm 171 of the motor diaphragm may be connected by a pipe 177ª with the interior of the furnace, said pipe being provided with a valve 177ᵇ.

Figures 6, 7:
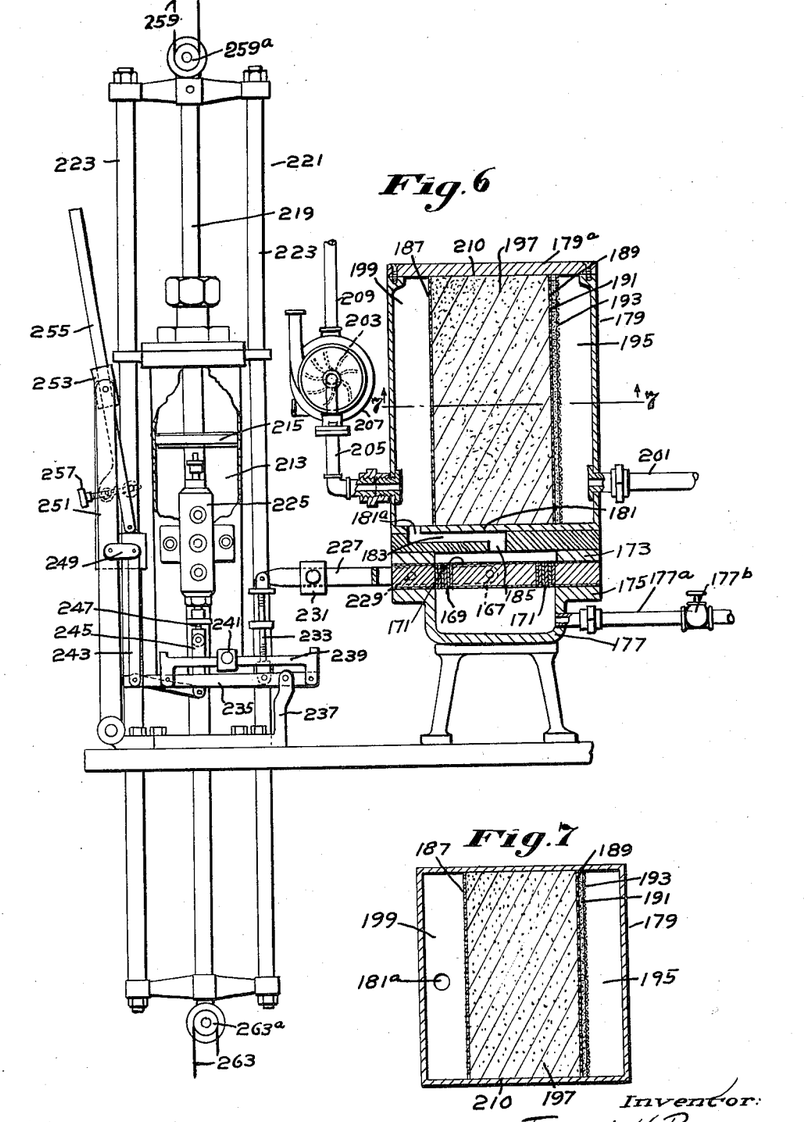
Fig. 6 is an elevation of a motor, and a vertical section of a device responsive to variations in the composition of the gases of combustion which may be employed for modifying or correcting the regulation obtained by the motors and mechanism shown in Figs. 2 and 4, or for correcting or modifying the primary regulation of any condition or combustion of fuel.
Fig. 7 is a horizontal section taken on line 7—7 of Fig. 6.

The diaphragm motor 171 will move up or down in response to variations in the $CO_2$ contents of the gases of combustion, as more fully hereinafter described. These movements of the diaphragm motor may be utilized to control power means for operating suitable devices to correct or modify the primary regulation. To accomplish this, in the present instance, the power means may be in the form of a cylinder 213 containing a piston 215 connected to a rod 219 adapted to reciprocate a frame 221 having rods 223 slidable in and guided by holes in extensions of the heads of the cylinder. To control admission of fluid pressure to the cylinder 213 at opposite sides of the piston 215 and exhaust therefrom, a pilot valve 225 may be provided similar to the pilot valve already described. The movements of the diaphragm motor may control the movements of the pilot valve. To accomplish this, in the present instance, a fork lever 227 may be pivotally connected to the block 167 of the diaphragm motor, and may be fulcrumed intermediate its ends on a pin 229 projecting from the outer spacing ring for the diaphragm 171. To counterbalance the weight of the block 167 and the fork lever 227, a weight 231 may be mounted on said lever and adjusted to the proper counterbalancing position. The outer end of the lever 227 may be connected by an adjustable link 233 with a lever 235 fulcrumed on a bracket 237 and provided with a bar 239 carrying a counterbalance weight 241. At the left end of the lever 235 a bell crank 243 may be pivotally mounted having its short arm connected by a link 245 with the stem 247 of the pilot valve. The long arm of the bell crank may be connected by a link 249 with a standard 251 having its lower end fulcrumed on an extension of the lower head of the cylinder. The upper end of the standard has a shoe 253 pivotally connected thereto, and an angle bar 255 is adapted to slide in said shoe and has its lower end connected to one of the rods 223 of the piston actuated frame 221. The angularity of the bar 255 with respect to the rod 223 may be varied by an adjusting screw 257.

In the operation of the $CO_2$ regulation device, the valve 177ᵇ is opened, thereby placing the chamber in the casing 177 in communication with the interior of the furnace, and subjecting said chamber to the pressure in the furnace. The fan 203 may be driven to draw a continuous sample of the gases of combustion from the furnace through the casing 179 and the $CO_2$ absorbent therein. The feed of fuel and supply of air to the furnace may be adjusted so that the process of combustion of the fuel will evolve gases of combustion, containing for example, 15% of $CO_2$. The absorbent 210 will absorb this percentage of the $CO_2$ gases as they pass therethrough, and the counterbalance weight 231 may be adjusted on the fork lever 227 to compensate for the difference in pressure in the chamber of the casing 177 beneath the diaphragm, and the pressure in the outlet chamber 199 above the diaphragm as reduced by the abstraction of the $CO_2$ from the gases of combustion. Thus, the diaphragm motor will be in a neutral position or stationary so long as the aforesaid predetermined percentage of the $CO_2$ gases are absorbed, or shift the draft controlling dampers or their equivalent in the desired direction when the $CO_2$ content of the gases vary from the predetermined standard set to correct the draft supply in either direction while the piston 101 in the cylinder 99 may be at rest.

If the gases of combustion contain less than 15% of $CO_2$, a smaller amount of $CO_2$ will be absorbed, and the pressure above the diaphragm will rise, thereby depressing the diaphragm, and this movement will be transmitted through the fork lever 227 to the lever 235, thereby rocking the latter in a clockwise direction (Fig. 6) on its fulcrum. This will rock the bell crank lever 243 and shift the pilot valve so as to admit fluid pressure into the cylinder 213 and move the piston 215, its rod 219, and the frame 221. This movement of the frame will slide the angle bar 255 in the shoe 253 and rock the standard 251 on its fulcrum, thereby shifting the bell crank lever and shifting the pilot valve so as to cut off further supply of fluid to the cylinder.

If, on the other hand, the percentage of $CO_2$ in the gases of combustion increases, a greater amount of $CO_2$ will be absorbed from the gases, and the pressure above the diaphragm will be reduced, thereby causing the latter to move upward and rock the fork lever 227 downward so as to move the lever 235 in a contra-clockwise direction (Fig. 6). This will shift the pilot valve so as to move the piston 215 in an opposite direction in the cylinder and move the piston rod 219 and frame 221. The movement of the frame will slide the angle bar 255 in the shoe 253 and rock the standard 251 so as to operate the pilot valve to cut off the supply of the fluid pressure to the cylinder and arrest further movement of the piston and frame.

Suitable means may be provided to transmit the movements of the piston actuated frame 221 to the primary control devices to correct or modify the regulation obtained thereby. To this end, in the present instance, the cord 155 leading from the frame 105 of the power device of the primary control motor to the uptake damper 49, may be provided with an upper loop 259 passing about a pulley 259$^a$ connected to the upper end of the piston actuated frame 221 and guided about upper rollers 261, and the cord 155 may have a loop 263 passing about a pulley 263$^a$ connected to the lower end of the frame 221 and guided about rollers 265. The construction is such that the cord 155 may be taken up or let off by the movements of the frame of the power device controlled by the $CO_2$ actuated motor, thereby to correct or modify the movement of the cord 155 in regulating the position of the uptake damper 49.

Therefore, the movement of this damper will be regulated primarily in response to variations in steam pressure and flow, or either of them, and modified or corrected by variations in the $CO_2$ content of the gases of combustion.

As stated, the invention also contemplates regulation of the supply of feed water to the steam generator. In the present instance, the feed water is conducted from a suitable source of supply to the generator through a pipe 266 (Fig. 1) provided with a valve 266$^a$. To control the operation of this valve automatically, a cord 266$^b$ or other suitable flexible connection may have an end anchored to the cord 155 referred to, said cord 266$^b$ being guided by a pulley 266$^c$ and continues downward therefrom and is connected to an arm 266$^d$ connected to the valve 266$^a$. The cord may project downward from said arm and have a weight 266$^e$ connected thereto. The construction is such that the valve in the feed water supply pipe will be regulated primarily in response to variations in steam pressure and flow, or either of them, and modified and corrected by variations in the $CO_2$ content of the gases of combustion.

If the steam pressure and flow remain constant, the piston 101 in the power means for the primary control will remain stationary, but if under such constant conditions the $CO_2$ content of the gases of combustion varies, the piston 215 of the power means actuated in response to $CO_2$ variations, will be moved and cause movement of the damper 49 in the uptake. Conversely, if the $CO_2$ content of the gases of combustion remain constant, and the steam pressure or flow vary, the piston 215 of the $CO_2$ power means will remain stationary, and the piston 101 of the steam pressure and flow power means will be moved and move the damper 49 in the uptake to regulate the exit of the gases of combustion from the furnace.

Also, the valve 266$^d$ controlling the supply of feed water to the generator, will be operated when the primary control conditions remain constant and the $CO_2$ conditions vary, or when the $CO_2$ conditions remain constant, and the primary control conditions vary.

As stated, the invention also contemplates regulation of the damper 53 in the intake passage 51 for controlling the air anteriorly of the combustion chamber in response to variations in the pressure in the furnace. Suitable means may be provided for this purpose, in the present instance, comprising a tank 267 (Figs. 1 and 5) containing water or other liquid and having a lever 269 pivotally mounted therein. One end of this lever carries an inverted cup 271 partially submerged in the liquid in the tank, and a nozzle 273 projects upward into said cup above the level of the liquid in the tank and communicates with the interior of the furnace through a pipe 275. The opposite end of the lever 269 carries an inverted cup 277 partially submerged in the liquid in the tank and serving to counterbalance the lever and the other cup, and to cushion the movements of the lever. The lever may be counterbalanced by a weight 269$^a$ held by a screw 269$^b$ in different positions of adjustment thereon.

The movements of this lever may be employed to control a pilot valve for admitting fluid to a power means for effecting regulation operations to be described. This power means, in the present instance, comprises a cylinder 279 containing a piston 281 having a rod 283 connected to a frame 285 having rods 287 slidable in and guided by holes in extensions of the heads of the cylinder. To control the admission of steam or other fluid to the cylinder at opposite sides of the piston and exhaust therefrom, a pilot valve 289 may be provided, and suitable means may be provided for operatively connecting the cup actuated lever 269 with said pilot valve. These connections, in the present instance, comprise an adjustable link 291 having one end adjustably connected to the lever 269, and its opposite end connected to a lever 293 fulcrumed intermediate its ends on a bracket 295. The left end (Fig. 5) of the lever 293 may have a bell crank 297 pivotally mounted thereon having a short arm connected by a link 299 with the pilot valve 289, and a long arm connected by a link 301 with a standard 303 having its lower end fulcrumed on the lower head of the cylinder 279. A shoe 301 may be pivotally connected to the upper end of the standard 303 and have an angle bar 305 slidably mounted therein. The lower end of the angle bar may be pivotally connected to one of the frame rods 287, and the angle of said bar with respect to said rod may be varied by an adjusting screw 307.

Figure 5:
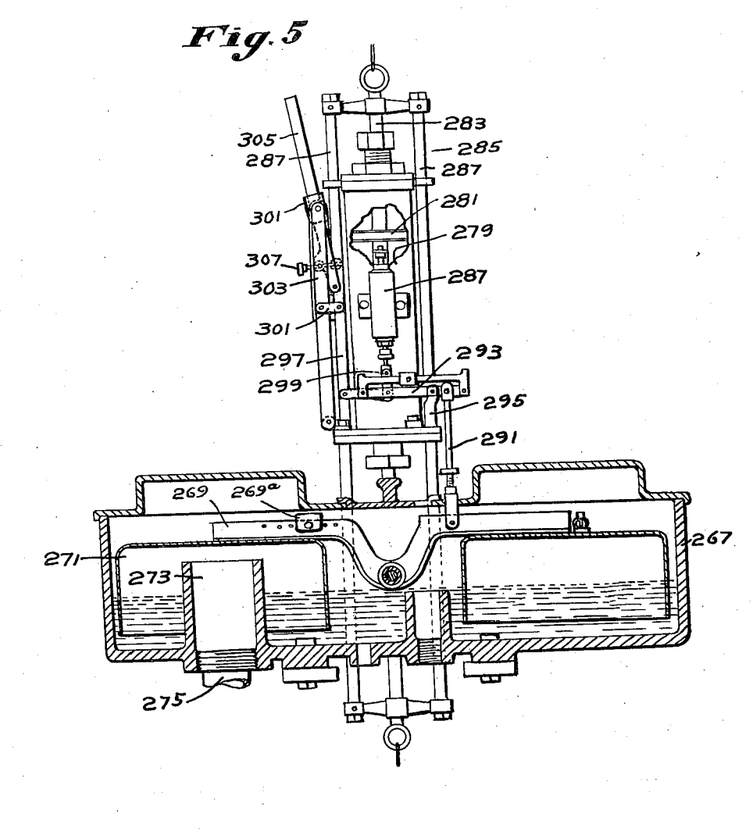
Fig. 5 is an elevation of the motor and mechanism operable in response to variations in the pressure in the furnace for controlling the intake damper, parts of said mechanism being shown in section.

In operation, variations in the pressure in the furnace will be transmitted from the furnace through the pipe 275 to the inverted cup 271 and cause rocking movements of the lever 269. These movements will be transmitted by the link 291 to the lever 293 which will rock the bell crank and operate the pilot valve to admit fluid pressure to the cylinder 279 to cause movement of the piston 281 therein, and movement of the rod 283 and frame 285 connected to the piston. The movement of the frame will shift the bar 305 in the shoe 301, thereby rocking the standard 303, and the latter in turn will rock the bell crank and cut off further movement of the piston. The piston will be moved up or down depending on the direction of rocking movement of the lever 269.

Suitable means may be provided to transmit movements of the piston actuated frame 285 to the damper 53 in the intake. To accomplish this, in the present instance, a cord 307 (Fig. 1) or other suitable flexible means may have its ends connected to the upper and lower ends of the frame 285, and the cords may be guided about upper rollers 309 and 311 and lower rollers 313 and 315. The vertical run of the cord 307 between the rollers 311 and 315 may be wound one or more turns about a pulley 317 connected to the damper 53. The construction is such that movements of the piston actuated frame 285 will shift the cord and adjust the damper 53 to regulate the amount of air supplied through the intake passage 51 to the combustion chamber. Thus, said damper will be regulated in accordance to variations in the pressure in the combustion chamber.

The present invention contemplates that the feed of fuel to the furnace may be regulated in response to variations in pressure in the furnace, and in the present instance, this regulation may serve as a secondary regulation to modify the primary regulation of the feed of the fuel as obtained in response to variations in steam pressure and flow, or either of them.

Suitable means may be provided to connect the frame 285 of the power means responsive to pressure variations, with the fuel feed actuating device referred to. To accomplish this, the lower end of the frame 285 may be connected by a link 319 (Fig. 1) with a pivotally mounted bell crank 321, connected in turn by a rod 323 with the eccentric actuated arm 37 referred to, of the fuel feed device. The effective length of the rod 323 may be varied by a turn buckle 324 connected thereto. The construction is such that reciprocatory movements of the piston actuated frame 285 will operate through the bell crank 321 and the rod 323 to rock the eccentric actuated arm 37 so as to move the roller 45 connected to the end of said arm in the slot 47 of the pawl arm 35, thereby to vary the effective length of said arm, and the pawl will be given a greater or less oscillatory movement with respect to the ratchet 31 according to the distance of the roller 45 from the axis of the ratchet. Thus, the feed of the fuel is primarily regulated in response to variations in steam pressure and flow, or either of them, and secondarily in response to variations in the pressure in the furnace.

Each may be modified by variations in another factor, such as the composition of the gases of combustion, thus establishing and maintaining a mutual interdependence and co-operation of corrective and modifying effects in any one or all of the actuating factors.

The pressure in the furnace is dependent among other things, on the regulation of the damper in the uptake. Since control of this damper is regulated primarily in response to steam pressure and flow, or either of them, and secondarily in response to variations in the composition of the gases of combustion, the pressure variations in the furnace will be indirectly varied in response to variations in the composition of the gases of combustion. Therefore, the means responsive to variations in the pressure in the furnace will have independent movements and also movements which are corrective or modifications of said independent movements, caused by variations in the composition of the gases of combustion, and by variations in the steam pressure and the steam flow, or either of them. The feed of the fuel to the furnace, the feed of water to the boiler, and the supply of air for combustion, may be mutually, reciprocably and interchangeably modified so as to maintain a predetermined desired efficient standard of operation.

Thus, by the apparatus described, the regulation of the fuel feed, the regulation of the air supply to the furnace, and the regulation of the gases escaping from the furnace are all corrected or modified in response to variations in the $CO_2$ content of the gases of combustion.

It will be understood that the invention is not limited to the apparatus shown and described, but that the method may be practiced in apparatus differing substantially therefrom, without departing from the spirit and scope of the appended claims.

What is claimed is:—

1. A method of regulating combustion of fuel in the furnace of a steam generator, which consists in primarily regulating the supply of air for promoting combustion of fuel by and in accordance with variations in steam pressure, and modifying such regulation by and in accordance with variations in the composition of the gases of combustion in the furnace.

2. A method of regulating combustion of fuel, which consists in primarily regulating the supply of air for promoting combustion of fuel by and in accordance with variations in the character of a fluid, and correcting or modifying such regulation by and in accordance with variations in $CO_2$ content of the gases of combustion.

3. A method of regulating combustion of fuel, which consists in primarily regulating the supply of air for promoting combustion of fuel by and in accordance with variations in the character of a fluid, and correcting or modifying such regulation by and in accordance with the variations in the composition of the gases of combustion.

4. A method of regulating combustion of fuel in the furnace of a steam generator, which consists in primarily regulating the supply of air for promoting combustion of fuel by and in accordance with flow of the steam, and modifying such regulation by and in accordance with variations in the composition of the gases of combustion in the furnace.

5. A method of regulating combustion of fuel which consists in primarily regulating conditions of combustion by and in accordance with variations in steam pressure and flow, and modifying such regulation in response to variations in the composition of the gases of combustion.

6. A method of regulating combustion of fuel in a furnace, which consists in primarily regulating the supply of fuel to the furnace by and in accordance with certain conditions of combustion or steam generation, and modifying such primary regulation by and in accordance with variations in the composition of the gases of combustion in the furnace.

7. A method of regulating combustion of fuel in a furnace, which consists in primarily regulating the supply of fuel to the furnace by and in accordance with variations in the pressure in the furnace, and modifying or correcting such primary regulation by and in accordance with variations in the composition of the gases of combustion in the furnace.

8. A method of regulating combustion in a furnace, which consists in primarily regulating the supply of fuel to the furnace by and in accordance with varying conditions of combustion or steam consumption, and modifying such primary regulation by and in accordance with variations in the pressure in the furnace.

9. A method of regulating combustion of fuel in the furnace of a steam generator, which consists in primarily regulating the supply of air anterior to the combustion chamber by and in accordance with variations in steam pressure and flow, or either of them, and modifying such regulation by and in accordance with variations in the composition of the gases of combustion in the furnace.

10. A method of regulating combustion of fuel in a furnace, which consists in primarily regulating the supply of air anterior to the combustion chamber for promoting combustion by and in accordance with variations in the character of a medium, and modifying such regulation by and in accordance with variations in the composition of the gases of combustion.

11. A method of regulating combustion of fuel in a furnace of a steam generator, which consists in primarily regulating the supply of fuel and air by and in accordance with variations in steam pressure and flow, or either of them, and modifying such regulation by and in accordance with variations in the composition of the gases of combustion.

12. A method of regulating combustion of fuel in a furnace, which consists in regulating the feed of air to the furnace by and in accordance with variations of pressure in the furnace, regulating the escape of gases from the furnace in response to steam flow and pressure variations, and modifying the regulation by and in accordance with variations in the composition of the gases of combustion.

13. A method of regulating combustion of fuel which consists in effecting a primary control of the air supply for promoting combustion and modifying such primary control by and in accordance with variations in the composition of the gases of combustion.

14. The method of regulating combustion of fuel which consists in effecting a primary control of the feed of fuel and modifying such primary control by and in accordance with variations in the composition of the gases of combustion.

15. The method of regulating combustion of fuel in a furnace which consists in effecting a primary control of the air supply for promoting combustion and modifying such primary control by and in accordance with variations in the pressure of gases in the furnace and by and in accordance with the variations in the composition of gases of combustion in the furnace.

16. A method of regulating combustion of fuel in the furnace of a steam generator, which consists in controlling the supply of air for promoting combustion, by and in accordance with variations in steam conditions and variations in the pressure in the furnace and to supplement such control by and in accordance with variations in the composition of the gases of combustion in the furnace.

17. A method of regulating combustion in a furnace of a steam generator which consists in controlling the supply of water in the generator, supply of fuel, supply of air to promote combustion by and in accordance with variations in the demand on the generator and supplementing and modifying such control by and in accordance with variations in the composition of the gases of the combustion.

18. The method herein described which consists in primarily regulating combustion in the furnace of a vapor generator by shifting the draft controlling damper and fuel feeding mechanism and shifting said damper and fuel feeding mechanism independently of movements during the primary regulation.

19. A method of regulating combustion of fuel, which consists in regulating the supply of air for promoting combustion of fuel by and in accordance with variations in the character of a fluid and variations in furnace pressure, and correcting or modifying such regulation by and in accordance with variations in the composition of the gases of combustion.

20. A method of regulating combustion in the furnace of a steam generator, which consists in regulating the supply of air for promoting combustion of fuel and feed of water to the generator by and in accordance with flow of steam from the generator and by and in accordance with variations in the pressure in the furnace of the generator, and modifying such regulation by and in accordance with variations in the composition of the gases of combustion in the furnace.

21. The method of regulating combustion of fuel in a furnace of a steam generator characterized by regulating conditions of combustion in the furnace by and in accordance with static and kinetic pressure of the steam developed by the generator and by and in accordance with variations in the pressure in the furnace and modifying such regulation by and in accordance with variations in the composition of the gases of combustion.

22. A method of regulating combustion of fuel in the furnace of a steam generator, which consists in regulating the supply of fuel to the furnace by and in accordance with certain conditions of combustion of the steam generator including the pressure in the furnace, and modifying such regulation by and in accordance with variations in the composition of the gases of combustion in the furnace.

23. A method of regulating combustion of fuel in a furnace, which consists in regulating conditions of combustion by and in accordance with variations in the pressure in the furnace, and modifying such regulation by and in accordance with variations in the composition of the gases of combustion.

24. A method of regulating combustion of fuel in the furnace of a steam generator, which consists in regulating the supply of fuel to the furnace by and in accordance with variations in static or kinetic pressure of steam developed by the generator, and by and in accordance with variations in the pressure in the furnace, and modifying or correcting such regulation by and in accordance with variations in the composition of the gases of combustion in the furnace.

In testimony whereof, I have signed my name to this specification.

FRANCIS H. BROWN.